US006248235B1

(12) United States Patent
Scott

(10) Patent No.: US 6,248,235 B1
(45) Date of Patent: Jun. 19, 2001

(54) FLUID PURIFICATION SYSTEM

(76) Inventor: Robin Scott, 5407 E. La Palma Ave., Anaheim, CA (US) 92807

( * ) Notice: Subject to any disclaimer, the term of this patent is extended or adjusted under 35 U.S.C. 154(b) by 0 days.

(21) Appl. No.: 09/281,011

(22) Filed: Mar. 30, 1999

(51) Int. Cl.$^7$ .................................................. C02F 1/32
(52) U.S. Cl. ..................... 210/192; 210/198.1; 210/209; 210/493.5; 210/499; 210/506; 422/177; 422/186.3
(58) Field of Search ................................. 210/748, 763, 210/192, 198.1, 205, 209, 493.1, 493.5, 506, 499; 422/177, 180, 181, 186.3

(56) References Cited

U.S. PATENT DOCUMENTS

| | | | |
|---|---|---|---|
| 3,928,112 | 12/1975 | Hamilton et al. | 156/319 |
| 4,104,360 | * 8/1978 | Meguerian et al. | 423/213.2 |
| 4,275,118 | 6/1981 | Baney et al. | 428/412 |
| 4,385,031 | * 5/1983 | Fratzer et al. | 422/176 |
| 4,544,471 | 10/1985 | Hetrick | 204/248 |
| 4,613,369 | * 9/1986 | Koehler | 75/246 |
| 5,024,827 | 6/1991 | Jones et al. | 423/610 |
| 5,045,288 | 9/1991 | Raupp et al. | 422/186.3 |
| 5,163,626 | 11/1992 | Urwin et al. | 241/1 |
| 5,227,053 | * 7/1993 | Brym | 210/143 |
| 5,308,458 | 5/1994 | Urwin et al. | 204/157.6 |
| 5,527,756 | * 6/1996 | Ostroff | 502/439 |
| 5,547,649 | * 8/1996 | Beck et al. | 423/230 |
| 5,564,065 | 10/1996 | Fleck et al. | 422/186.3 |
| 5,683,589 | * 11/1997 | de Lasa et al. | 210/748 |
| 5,756,207 | * 5/1998 | Clough et al. | 428/375 |
| 5,933,702 | * 8/1999 | Goswami | 422/186.3 |
| 5,948,355 | * 9/1999 | Fujishima et al. | 422/4 |

FOREIGN PATENT DOCUMENTS

| | | |
|---|---|---|
| 10-009661 | 1/1998 | (JP) . |
| 10-085558 | 4/1998 | (JP) . |
| 10-238799 | 9/1998 | (JP) . |

OTHER PUBLICATIONS

Search Report; 17 pp.
Search Report; 13 pp.
Ti–Pure Home page; "The Mineral Antase"; 3 pp.
Frees, Inc. Oxidation Service; "Meeting the Air Quality Challenges of the $21^{st}$ Century and Beyond"; 2 pp.
Lynnae Carison–Boyd, National Renewable Energy Laboratory; "Photochemical Treatment of Pollutants"; 4 pp.
Richard W. Siegel; "Creating Nanophase Materials"; Scientific American—Dec. 1996, vol. 275, No. 6, pp. 1–7.
Nanophase Technologies, Apr. 1998 Brochure Regarding Materials in Production and Materials Under Development; 6 pp.
Robert Pool; "ATOM—Dick Siegle Has Invented A State–of–the–Art Forge That Manipulates Matter A Molecule At a Time . . . "; Discover—Dec. 1996; pp. 54–63.

* cited by examiner

Primary Examiner—Peter A. Hruskoci
(74) Attorney, Agent, or Firm—Knobbe, Martens, Olson & Bear, LLP

(57) ABSTRACT

A photocatalytic oxidation purification system includes an ultra violet light source and a filter that comprises a pleated wire mesh substrate with a nanophase metal oxide oxidation catalyst suspended on the substrate, wherein the catalyst is applied without an adhesive using an electromechanical plating process. As a fluid containing organic contaminants is directed through the filter in the presence of ultra violet light from the light source, the catalyst oxidizes and decomposes the organic contaminants into environmentally harmless components. Methods of making the purification system including preparing a solution of catalyst and applying the catalyst without adhesive binding material to the filter substrate electromagnetically.

13 Claims, 2 Drawing Sheets

FLUID PURIFICATION SYSTEM

BACKGROUND OF THE INVENTION

1. Field of the Invention

The present invention relates generally to fluid purification and, in particular, to a method and assembly for the photocatalytic oxidation of contaminants within fluid streams.

2. Description of the Related Art

One of today's most pressing societal problems is environmental pollution. The Earth's atmosphere is contaminated by hazardous organic pollutants such as solvents, alcohols, dyes, and fuel oils. Such contaminants pose serious health risks. As a result, purification systems are needed to clean air and water to healthy levels in both the home and the work place. Purification systems also serve to permit contaminating factories to comply with environmental regulations.

In recent years, photocatalytic oxidation has emerged as a generally effective method of purifying fluids such as air and water. This method involves directing a flow of a contaminated fluid into contact with an oxidation catalyst that is simultaneously exposed to electromagnetic radiation. Pollutants contained within the fluid are adsorbed onto the surface of the oxidation catalyst. As a result, the pollutants are oxidized and thereby decomposed into environmentally innocuous components such as water and carbon dioxide. One catalyst that has been used is anatase titanium dioxide ($TiO_2$). The absorption of ultra violet light energy causes the $TiO_2$ to become highly reactive.

Early photocatalytic oxidation techniques were unsuitable for incorporation into conventional HVAC systems because they were limited to relatively slow flowrates or were applicable only for liquid flowstreams. For example, U.S. Pat. No. 5,045,288 to Raupp et al. teaches a method wherein a contaminated fluid flows vertically upward through a reaction chamber containing a catalyst bed of loose anatase titanium dioxide particles resting upon filter paper. Ultra violet light from a source outside of the reaction chamber is exposed onto the outer periphery of the catalyst bed, producing the desired oxidation of contaminants. One limitation of the Raupp system is that the presence of the filter paper and the large catalyst bed causes a relatively high pressure loss within the fluid. The filter paper, although sufficiently porous to permit fluids to slowly flow through it, tends to restrict the flow. Thus, the fluid pressure decreases as it passes through the filter. Above the filter and downstream thereof, the large catalyst bed further restricts the flow, decreasing the pressure even more. Such pressure loss limits the fluid flowrate and, consequently, the overall rate of purification as well.

Another limitation is that only those catalyst particles on the outer edges of the catalyst bed are exposed to the ultra violet light. Such limited surface area of light exposure results in limited overall oxidation, non-uniform oxidation rates within the flowstream, and non-use of the catalyst particles in the center of the catalyst bed, which are not exposed to the light.

U.S. Pat. Nos. 5,163,626 and 5,308,458 to Urwin et al. teach a method wherein a flow of contaminated liquid is exposed to ultra violet light as it flows over a horizontal spinning disc utilized to agitate the liquid. According to a first method, anatase titanium dioxide is mixed within the contaminated liquid to produce the desired contact between the contaminants and the catalyst. According to a second method, the catalyst is coated onto the spinning disc to produce the desired contact. The disc is coated by immersing the disc within an aqueous solution of the catalyst and then baking the disc. The immersion/baking cycle is repeated 7 to 15 times.

There are several limitations of the Urwin system. One limitation is that it cannot effectively be used for gas flowstreams, such as air. Regarding the first method, it is difficult if not impossible to mix the anatase titanium dioxide particles within a gas, since the particles generally are not light enough to be carried by the gas. Regarding the second method, a gas flowstream is not desirable because most of the gas will not come into contact with the disc surface. Rather, most of the gas will flow above the disc and avoid being oxidized by the titanium dioxide. Another limitation of the Urwin system is that it is relatively complex and expensive to manufacture. For example, the inlet tube through which the liquid flows onto the spinning disc also spins along with the disc. The utilization of moving parts makes it more difficult to maintain a leak-free environment and necessitates frequent replacement of motors and other parts. Another limitation of the first method in particular is that the process necessitates the further step of filtering the titanium dioxide particles from the purified liquid. Another limitation of the second method in particular is that the repeated immersion/baking process is relatively time-consuming, yet produces a highly non-uniform coating and a relatively weak bond between the catalyst and the disc.

More recent photocatalytic oxidation methods involve less expensive, passive filters which are more suited for use in conventional HVAC systems. Such filters have relatively large fluid passageways therein so that a fluid stream may pass through the filter without significant pressure loss. Also, such filters do not have moving parts like the spinning disc of the Urwin system, which may complicate the design and necessitate frequent replacement of such parts. The filter is typically manufactured by coating an adhesive binding material, such as a polymer, epoxy, or other binder, onto an inert substrate. The binding material may either be intermixed with a catalyst or the catalyst may be coated onto the binding material after the latter is applied to the substrate. A limitation of such filters is that ultra violet radiation tends to burn away the adhesive material, causing the catalyst to flake off of the substrate.

One example is U.S. Pat. No. 5,564,065 to Fleck that teaches a purification system comprising a reaction chamber filled with a fine fibrous material, such as fiberglass. A powder form of anatase titanium dioxide catalyst is coated onto the fibrous material by first applying an adhesive liquid onto the material and then spraying the catalyst thereto. The liquid adhesive is applied by immersing the fibrous material in a bath of the liquid adhesive and then removing the fibrous material. As the catalyst is sprayed onto the material, catalyst particles stick to the adhesive liquid coating, forming a layer of the catalyst on the fibrous material. Ultra violet light is generated by a light source in the center of the chamber.

Similarly, Japanese patent Application No. 10-238799 teaches a filter comprising an aluminum corrugated honeycomb substrate coated with a colloidal silica type binder containing anatase titanium dioxide catalyst. The catalyst is first mixed with the binder. The binder is then coated onto the substrate to form the filter. Ultra violet light is provided by a nearby light source.

Several characteristics of such filters limit their effectiveness. One limitation is that, as mentioned above, the ultra violet light tends to burn away the adhesive material that carries the catalyst. In operation, these filters lose catalyst particles relatively quickly and must be frequently replaced. Another limitation is that use of an adhesive binding material often results in an uneven coating of the catalyst on the filter, resulting in a waste of unusable catalyst. Another limitation is balancing the need to maximize contaminant contact with the catalyst with the need to minimize pressure drop access the filter. Prior art photocatalytic oxidation systems do not strike the balance very well, resulting in either high contact and high pressure drop or low pressure drop, but low contact. A further limitation is that with some systems only a very limited surface area of the catalyst is exposed to the ultra violet light, resulting in a lower overall oxidation rate, non-uniform oxidation, and waste of the unexposed catalyst.

Although prior art photocatalytic oxidation systems are generally effective, there is a need to improve purification rates by providing increased catalyst surface contact area and by increasing the portion of the catalyst surface that is directly exposed to electromagnetic radiation. There is also a need to increase system efficiency by minimizing the loss of catalyst through general use, resulting in less shutdowns for filter replacement.

SUMMARY OF THE INVENTION

Accordingly, it is a principle object and advantage of the present invention to overcome some or all of the limitations of the prior art and to provide an improved photocatalytic oxidation filter with a higher rate of purification.

The present invention comprises a durable, flexible, long-lasting photocatalytic oxidation filter with a substantially uniform, strongly-bonded, non-adhesive, coating of an oxidation catalyst thereon, as well as a method of manufacturing and using a photocatalytic oxidation filter, to improve upon purification rates and improve purification efficiency by minimizing the loss of the catalyst during general use. The present invention provides a filter configured to have a relatively large surface contact area of the catalyst without significantly limiting the portion of the catalyst surface that is directly exposed to a source of electromagnetic radiation and without causing a high pressure drop.

In accordance with one embodiment, the present invention comprises an assembly for decomposing organic components within a fluid where the assembly directs the fluid into contact with an oxidizing catalyst that is exposed to electromagnetic radiation. The assembly comprises a filter with an oxidizing catalyst suspended there on, a fan for directing the fluid into contact with the catalyst, and an electromagnetic radiation source adapted to emit electromagnetic radiation onto the filter as the fluid is flowing through the filter. The filter comprises a pleated, wire mesh screen formed from a transition metal and an oxidation catalyst electromagnetically coated onto the screen. The oxidizing catalyst comprises metal oxide such as nanophase anatase titanium dioxide and has the property of accelerating the oxidation of the organic components when the oxidizing catalyst is excited by the electromagnetic radiation. The filter is configured to efficiently purify the organic compounds within the flow without substantially impeding the flow.

In accordance with another embodiment, the present invention comprises a method of manufacturing a purification system for decomposing organic contaminants within a fluid. The method comprises a step of providing a source of electromagnetic radiation and a step of providing a filter in which the filter comprises a pleated substrate formed from a transition metal with a nanophase metal oxide catalyst suspended on the substrate. The step of providing a filter comprises the steps of mixing a metal oxide catalyst with a solvent, such as water, to form a solution, applying ultrasonic or mechanical energy to the solution, etching the substrate, and applying the catalyst solution to the etched substrate using an electromechanical process. In one embodiment, the step of applying the catalyst comprises adding a wetting agent to the solution, adding a polar solvent to the solution, adding an electrically conductive solvent to the solution to make the solution electrically conductive, providing a power source having a positive terminal and a negative terminal, electrically connecting one or more anodes to the positive terminal of the power source, submerging the anodes within the solution, electrically connecting the substrate to the negative terminal of the power source so that the substrate forms a cathode, submerging the substrate within the solution, and baking the substrate at a temperature greater than about 150° F. During the step of submerging the substrate within the solution, the power source applies a negative charge onto the substrate and generates a current within the solution, whereby positive ions of the catalyst are coated onto the substrate, forming a high strength bond between the catalyst and the substrate.

In accordance with yet another embodiment, the step of applying the catalyst comprises the steps adding a wetting agent to the solution, adding a polar solvent to the solution, applying a negative charge onto the substrate, spraying the solution through a positively charged needle onto the substrate, and baking the substrate at a temperature greater than 150° F. Positively charged ions of the catalyst form within the solution as the solution flows through the positively charged needle. The ions become attracted to the negatively charged substrate to form a high strength bond between the catalyst and the substrate.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION OF THE PREFERRED EMBODIMENT

Figure 1:
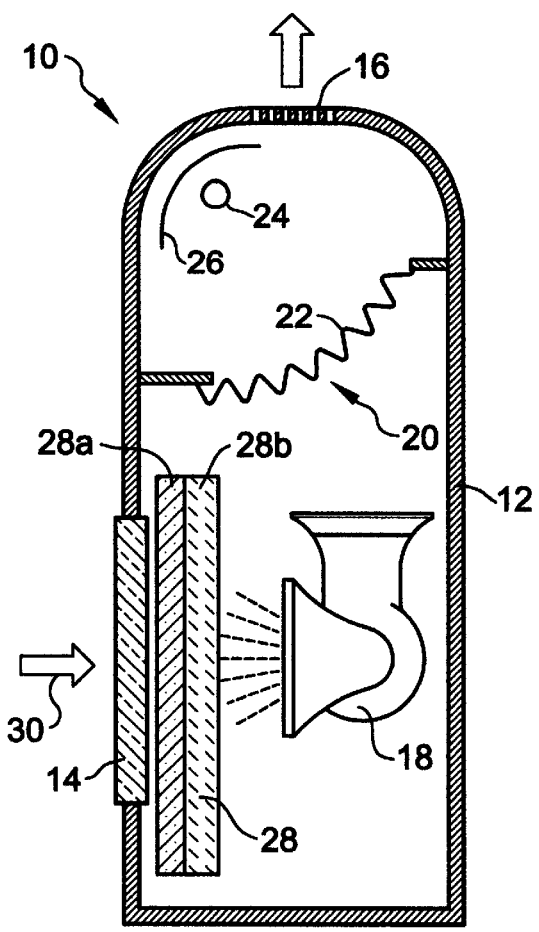
FIG. 1 is a schematic view of a photocatalytic oxidation purification system in accordance with the present invention.

Referring now to the accompanying figures, various embodiments of the present invention may be explained in more detail. With reference first to FIG. 1, the present invention comprises a photocatalytic oxidation purification system filter system 10 for purifying a fluid. The purification system 10 operates to effectively remove substantially all of the organic contaminants in a gaseous or liquid flowstream. The system 10 comprises a housing 12 with a fluid intake vent 14 and a fluid outlet vent 16 wherein the housing encloses means 18 for directing fluid from the intake vent 14 to the outlet vent 16. The housing 12 also encloses an oxidation catalyst filter 20 comprising a substrate 22 supporting catalyst thereon, a source of electromagnetic radiation 24, an optional reflector 26 and an optional means for pre-filtering the fluid 28. In operation, fluid 30 is directed by the directing means 18 from the ambient through the intake vent 14, through the optional pre-filter means 28, through the oxidation catalyst filter 20, and out through the outlet vent 16. By the time the fluid drawn into the intake vent 14 has passed the oxidation catalyst filter 20, substantially all of the organic contaminants present in the fluid are oxidized and removed.

In one embodiment of the present invention, the directing means 18 comprises a blower for mechanically directing fluid through the purification system 10, although any means for directing fluid efficiently within the housing 12 is contemplated. The source of electromagnetic radiation 24 comprises an elongate light bulb that when energized radiates energy in a range that includes ultra-violet light, although energy radiated in a wider or different range of electromagnetic energy may be effective. When activated, the electromagnetic energy radiates and contacts the filter directly. If desired, a reflector 26 may be positioned within the housing 30 wherein the reflector is configured such that the radiation directed toward the reflector 26 from the light bulb bounces back and hits the catalyst filter 20 indirectly. In one embodiment of the present invention, the optional pre-filter means 28 comprises a 5 micron pre-filter 28a and a HEPA filter 28b.

As contemplated, contaminants within the flow 30 are adsorbed onto the surface of the substrate 22 that makes up the catalyst filter 20. The oxidation catalyst on the catalyst filter is simultaneously excited by energy received from the electromagnetic radiation source and decomposes the adsorbed contaminants into environmentally innocuous compounds. For example, carbon monoxide, a toxic compound, is decomposed into water and carbon dioxide. Similarly, many other organic compounds, both simple and complex, such as alcohols, solvents, dyes, and fuel oils, may be decomposed into harmless compounds.

Figure 2:
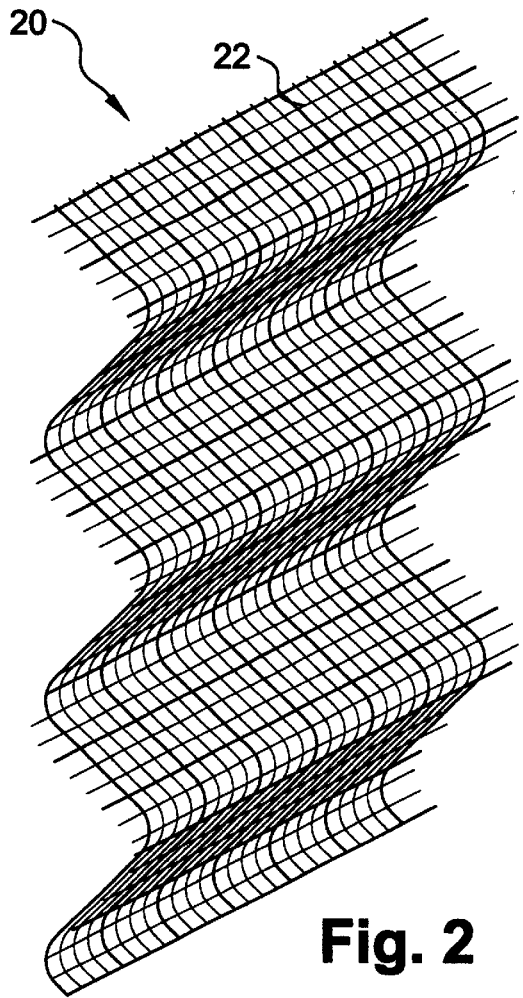
FIG. 2 is a perspective view of the photocatalytic oxidation filter of FIG. 1.

The substrate 22 preferably has a plurality of orifices large enough to permit the fluid 30 to pass through the catalyst filter 20 without significant pressure loss. With reference to FIG. 2, the substrate 22 preferably comprises a wire mesh screen, although it may be of any configuration that minimizes the pressure drop across the filter while simultaneously providing a large surface area of contact between the catalyst on the filter and the contaminants in the fluid. The wire mesh consists of a plurality of cells formed from the junction of each wire in the mesh. In this case, the cells are generally square-shaped so as to permit the passage of fluid therethrough in such a manner that contaminants with the fluid are more likely to come into contact with the walls of the cells (i.e., the wires) as fluid passes therethrough. The generally cylindrical cross-section of the wires in the mesh is also advantageous in that it permits better interface between the catalyst supported on the wires and the fluid contaminants. Of course, the cells of wire mesh may come in all sizes. It is preferred that the cell size be sufficiently small, but not so small as to impede the flow of fluid. It is contemplated that the substrate be of any configuration having openings forming cells through which an impure fluid may pass. It is important that the walls of the cells maximize contact of catalyst supported thereon with contaminants within the fluid. Certain honeycomb designs of the prior art incorporated openings (cells) that were too large to effectuate sufficiently high contact between the substrate cells and the contaminants. It is also important that the substrate 22 have sufficient strength and flexibility to permit a strong bond with the catalyst and withstand significant flows of contaminated fluid therethrough. Preferably, the substrate is made of a transition metal such as aluminum, although other transition metals may be effective as well. To further enhance contact between the catalyst supported on the substrate 22 and the contaminants in the fluid 30, the substrate 22 is preferably pleated to minimize the volume of fluid that does not physically contact the substrate 22 as its passes therethrough. The pleats of the substrate 22 may have any particular shape or configuration provided the substrate is substantially not flat. By pleating the substrate, the centerline of the substrate cells may be positioned at an angle relative to the direction of flow of the fluid. The pleated configuration also generates turbulence within the fluid flow, limiting the possibility that a portion of the fluid would pass through the filter without coming into contact with the catalyst. This permits the system to achieve faster purification and to accommodate higher fluid flowrates. In that regard, the present invention is a significant improvement over prior art filter substrates that, in order to minimize pressure drops, incorporated fluid cells or openings that were either very large or were not angled relative to the direction of flow. The present invention is also a significant improvement in that it is made of a material that bonds effectively with the catalyst without an adhesive, as explained below, and can withstand high flow rates without collapsing.

The light source 24 provides light energy to the filter 20. Faster and more effective oxidation of contaminants has been achieved by using ultra violet light having a wavelength in the range of about 200–400 nanometers. When used in combination with a pleated substrate 22, the light source 24 is preferably tubular in shape and has a length substantially equal to the length of the substrate 22, although a light source shorter or longer may still be effective. This configuration does not significantly impede fluid flow through the system, and it ensures that substantially all of one side of the pleated substrate will be directly exposed to light 26. Other shapes of the light source could also be utilized, keeping in mind these goals. The light source 24 may be provided either upstream or downstream of the filter 20. Alternatively, multiple light sources could be provided so that both sides of the filter 20 are exposed to the light.

Ultra violet light rays are unidirectional, which means that any surface that is not directly exposed to the light source will not receive any light energy therefrom. Purification can be improved if a larger portion of the catalyst surface is directly exposed to the light. Therefore, the tubular light source 24 is preferably oriented perpendicular to the direction of the pleats in the substrate 22. This ensures that substantially all of the surface area of the filter, on one side, is directly exposed to the light 26 emitted from the light source 24. Alternatively, the light source and filter may be positioned so that the light source 24 is oriented parallel to the direction of the pleats of the filter 20. In that arrangement, it may be desirable to bow the filter so that its entire surface is exposed to the light source. It is possible, however, to orient the light parallel to the pleats without bowing the substrate and still ensure that the entire surface of the substrate facing the light will be exposed. The angle of the pleats may effect whether the entire side is exposed.

As alluded to above, oxidation rates may be improved by providing some means of utilizing more of the light emitted from the light source 24. In one embodiment, the reflector 26 is used to indirectly radiate energy back to the catalyst filter 20.

Alternatively, one or more filters may be provided in a manner surrounding the light source so that substantially all of the light may be utilized for purification.

Regarding the catalyst, a preferred catalyst is anatase titanium dioxide ($TiO_2$). Alternative catalysts may be used, however, including zirconium oxide ($ZrO_2$), antimony oxide ($Sb_2O_4$), zinc oxide (ZnO), stannic oxide ($SnO_2$), cerium oxide ($CeO_2$), tungsten oxide ($WO_3$), and ferric oxide ($Fe_2O_3$). To maximize the effectiveness at purifying the fluid, the preferred embodiment of catalyst for the present invention is nanophase anatase $TiO_2$; i.e., particles having a diameter as small as approximately $10^{-9}$ meters, to maximize the number of "receptor sites" where the catalyst gives up electrons to oxidize pollutants. As the number of receptor sites of the catalyst is increased, the oxidation rate rises. For anatase titanium dioxide, the inventor understands that a 50% reduction in average particle size would increase the oxidation rate by a factor of twelve. Thus, a significant particle size reduction can improve oxidation rates by orders of magnitude.

Figure 3A:
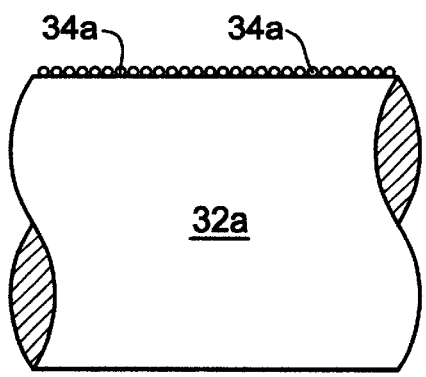
FIG. 3A is a magnified sectional view of a surface of the filter substrate with one embodiment of a nanophase oxidation catalyst coated thereon.
Figure 3B:
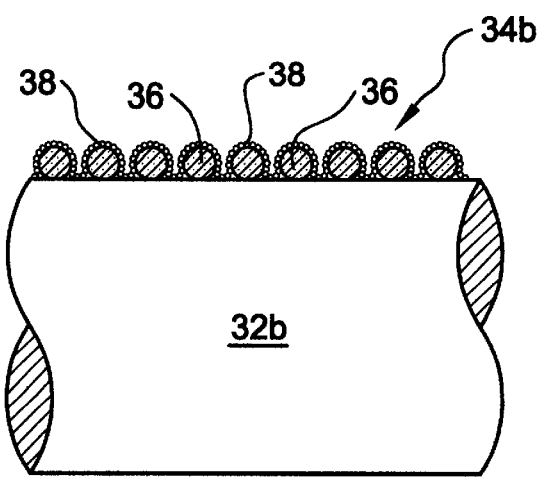
FIG. 3B is a magnified sectional view of a surface of the filter substrate with an alternative embodiment of the oxidation catalyst comprising a hybrid microphase-nanophase catalyst coated thereon.

Referring now to FIG. 3A, it can be appreciated that the present invention contemplates that the entire surface of the substrate, which in the preferred embodiment is wire mesh 32a, is coated with a nanophase catalyst 34a, preferably a metal oxide. A filter coated with a nanophase metal oxide catalyst without the use of adhesive bonding advantageously provides faster oxidation than existing photocatalytic oxidation filters. It is contemplated that faster and more efficient oxidation may be achieved, however, by increasing the fluid contact surface area of the nanophase catalyst even more. A larger contact surface area of the nanophase catalyst coating may be produced by coating a mixture of microphase and nanophase catalyst particles onto the substrate 22, where microphase catalyst comprises particles having a diameter of the magnitude of $10^{-6}$ meters. FIG. 3B shows a cross-section of the surface of the substrate, preferably a wire mesh 32b, with a mixture 34b of microphase and nanophase anatase titanium dioxide are mixed together. The mixture may be prepared by applying a solution of microphase and nanophase catalyst to the substrate in the same manner as a solution of nanophase catalyst is applied to the substrate, as explained further below. The solution of microphase and nanophase catalyst is prepared by adding microphase catalyst and nanophase catalyst to a container of solvent and blending the solution with an osterizer having high speed impellers. During the blending process, the larger microphase particles 36 act to shear the smaller nanophase particles 38 down to their smallest particle size. In the process, the nanophase particles 38 become coated onto the larger microphase particles 36. Thereafter, the microphase-nanophase catalyst mixture may be applied to the substrate 22 according to one of the manufacturing methods described below.

Advantageously, this process greatly increases the contact surface area of the nanophase particles 38, improving oxidation rates and permitting larger flowrates of fluid through the filter. For a pleated wire mesh substrate 22 having a surface area on one side of about 80 $in^2$, flowrates of about 270 $ft^3$/minute can be accommodated. A further advantage of mixing microphase and nanophase catalyst particles together is that it results in a stronger, more durable coating of the catalyst onto the substrate 22. This is because the nanophase particles reside within the interstices between the microphase particles, thereby strengthening the microphase layer. This enhances the ability of the catalyst to remain on the substrate 22 even when the substrate is flexed. Sufficient strength and durability of the catalyst coating have been achieved by utilizing a catalyst comprising at least about 30% nanophase particles. From a balance of economy and effectiveness, a catalyst mixture comprising about 70% microphase particles and about 30% nanophase particles is preferred given the less expensive cost of microphase catalyst as compared to nanophase catalyst.

A nanophase catalysts such as nanophase anatase titanium dioxide is available in powder form from Nanophase Technologies Corporation of Illinois for about $55/lb. The average particle size of such nanophase anatase titanium dioxide available from Nanophase Technologies is about 30 nanometers. Microphase catalysts can be acquired from a variety of sources. One powder form of microphase anatase titanium dioxide that is suitable for the embodiments described above is Kronos 1000, sold by Kronos for about $5/lb. This substance has an average particle size of about 0.2 microns. Those in the art will understand that these substances are exemplary and that other substances having different particles sizes may be utilized, keeping in mind the goals of rapid oxidation of organic contaminants and producing a more durable, long-lasting coating of the catalyst onto the substrate 22.

Figure 4:
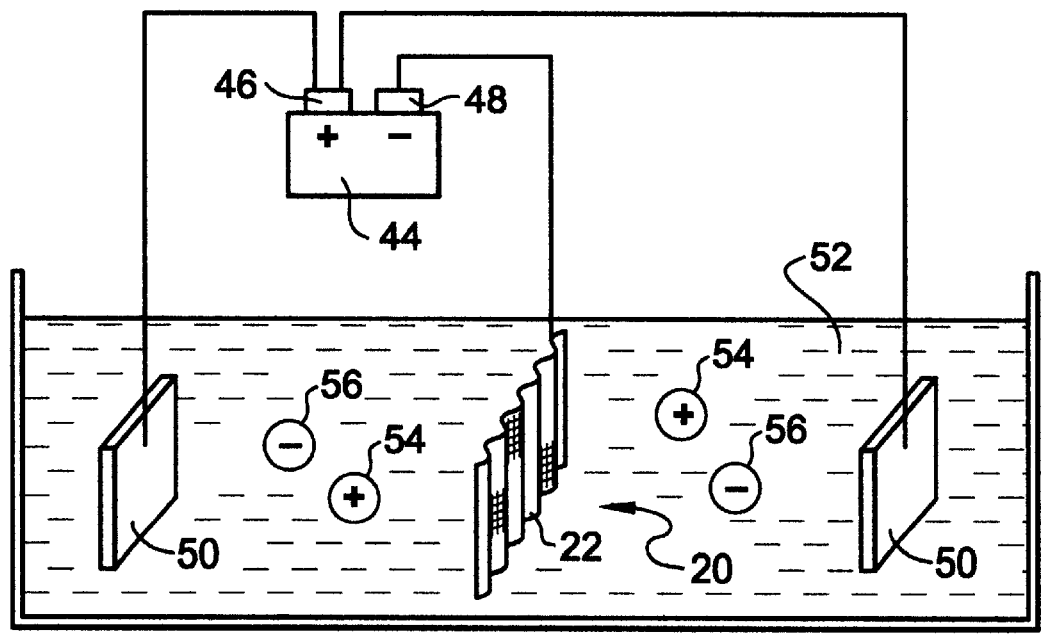
FIG. 4 is a schematic view illustrating one embodiment of a method of the present invention of electromagnetically plating the catalyst onto the filter substrate.

The present invention also comprises a method of manufacturing a purification system that comprises the steps of providing a catalyst filter having qualities and benefits substantially as described above. The step of providing a catalyst filter with the capabilities of supporting a nanophase catalyst comprises the steps of etching a substrate made of a transition metal such as aluminum and preparing a catalyst solution for application to the substrate. The method also comprises the step of applying the catalyst solution to the substrate in a manner so as to result in a strong non-adhesive bond between the catalyst and the substrate. In one embodiment of the present inventive method, the step of applying the catalyst solution comprises electroplating the substrate with the catalyst solution. With reference to FIG. 4, in one particular embodiment, the electroplating step comprises using a power source 44, such as a 12-volt DC battery, having a positive terminal 46 and a negative terminal 48. The substrate 22 is electrically connected to the negative terminal 48 of the power source 44, which imparts a negative charge onto the substrate. The substrate, therefore, becomes a cathode. One or more electrodes 50 are electrically connected to the positive terminal 46 of the power source 44, which imparts a positive charge onto the electrodes 50. The electrodes 50, thus, become anodes. The substrate 22 is preferably formed from a transition metal, i.e., a metal that easily gives up electrons, such as aluminum or copper. This permits the substrate to more easily conduct electricity in order to form a current within a solution of catalyst and solvent 52. The catalyst preferably has a high positivity, which allows catalyst particles to more easily become positively ionized. A preferred catalyst is anatase titanium dioxide, since it has a very high positivity.

The substrate 22 and anodes 50 are then submerged within the solution 52 containing the catalyst, preferably for about 60–70 seconds. Catalyst particles 54 within the solution 52 lose electrons 56 that are attracted to the positively charged anodes 50. The positively ionized catalyst particles 54 are then magnetically attracted to the negatively charged substrate 22. As a result, the catalyst particles 54 become coated onto the substrate. The anodes 50 are preferably arranged in a manner so as to surround the substrate 22, which results in a more uniform coating of the catalyst thereto. Finally, the substrate is removed from the solution 52 and baked at a high temperature, preferably about 750° F., to prevent the catalyst particles from recrystallizing. Advantageously, the baking step effectively freezes the particles in position. It is not necessary to bake for a long period of time. All that is necessary to prevent recrystallization is to bring the substrate 22 to a high temperature for a short period.

The step of providing the catalyst solution 52 preferably comprises the steps of adding a powder form of nanophase catalyst into a bath of solvent, such as distilled water, to form a solution. In one preferred embodiment, the catalyst is a mixture of microphase and nanophase anatase titanium dioxide blended together with mechanical energy provided by an osterizer or "sandmill". The latter consists of adding sand to the solution and inserting a spinning disc that circulates the sand within the solution in a turbulent fashion. The sand breaks down the catalyst to its smallest particles. The sand may then be filtered out, leaving a well mixed solution. It should be noted that pure microphase or pure nanophase particles could be used. Energy in the form of ultrasound energy, for example, may be applied to the solution 52 by submerging a high frequency transducer therein. The ultrasound energy breaks the catalyst particles down to their smallest size. The method further comprises the step of adding a wetting agent to the solution to reduce the surface tension of the solution, which has the benefit of improving the uniformity and adherence of the catalyst coating onto the substrate 22. A suitable wetting agent for this purpose is TRITON ® X-100, sold by J. T. Baker. A polar solvent may then be added to dissolve the polar (i.e., organic) wetting agent within the non-polar (i.e., inorganic) water-based solution, to improve the adherence of the catalyst onto the substrate 22. A suitable polar solvent for these purposes is ethyl alcohol. Further, an electrically conductive solvent is added to make the solution electrically conductive and to, thus, enable the electroplating process. A suitable conductive solvent is hydrochloric acid. Optionally, a corrosive solvent may also be added, which etches the substrate 22 when the substrate is submerged within the solution 52. The etching of the substrate produces a rougher surface thereon, which improves the adherence of the catalyst onto the substrate. It also permits the catalyst to mechanically bond to the substrate. A suitable corrosive solvent for this purpose is, again, hydrochloric acid. Alternatively, or perhaps additionally, the substrate 22 may be etched prior to being submerged within the solution 52, simply by exposing the substrate to a low pH acid solution.

The above-described electroplating process produces a highly effective catalyst filter 20 for use in photocatalytic oxidation systems. Electroplating advantageously produces a highly stable and flexible filter, compared to prior art filters manufactured by binding the catalyst to the substrate with an adhesive or immersing a substrate within a catalyst solution and then baking it. Filter substrates manufactured according to the electroplating method identified above can be repeatedly flexed without causing significant, if ant, catalyst particles to flake off of the substrate.

Figure 5:
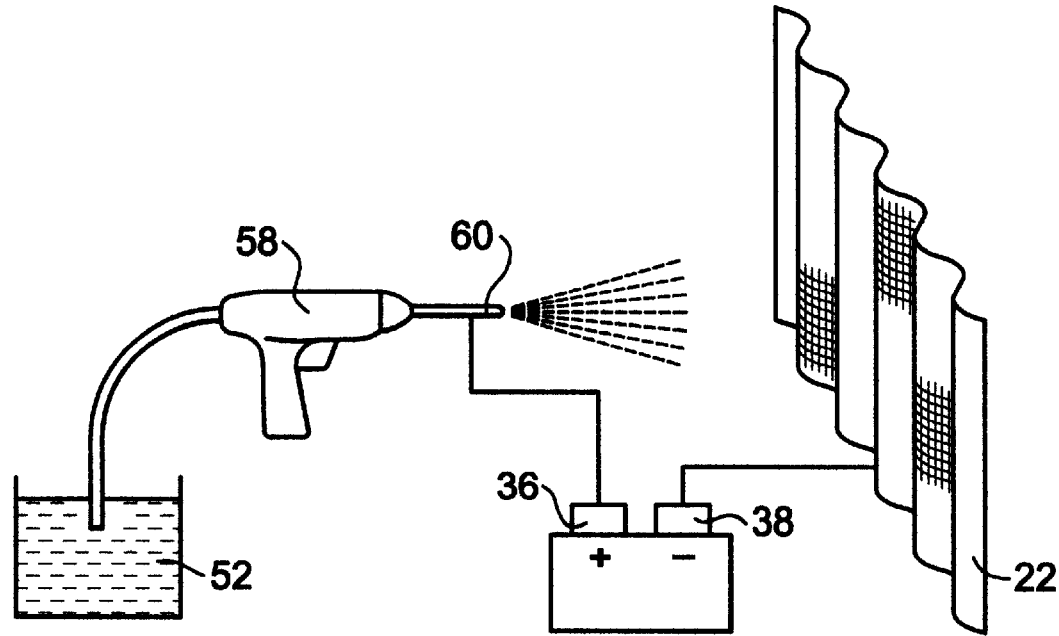
FIG. 5 is a schematic view illustrating an alternative embodiment of a method of the present invention of electromagnetically plating the catalyst onto the filter substrate.

An alternative method of electromechanically coating the catalyst onto the substrate 22 comprises electrostatically spraying the catalyst solution 52 onto the substrate. With reference to FIG. 5, alternative steps of applying a catalyst solution 32 onto the substrate 22 may be described. According to this method, the solution 52 is made as described above, except that there is no need to include an electrically conductive solvent. A spray gun 58 having a needle 60 is configured to spray the solution 52 under pressure onto the substrate 22. Both the needle 60 and substrate 22 are preferably formed from a transition metal. A very fine spray can be generated by using a needle having a small orifice, preferably about 0.005 inches in diameter, and by spraying under a pressure within the range of about 1000–1500 psi. This improves the uniformity of the catalyst coating and minimizes waste of the catalyst.

A power source 44 having positive and negative terminals 46 and 48, respectively, is also provided. The needle 60 is electrically connected to the positive terminal 46, which imparts a positive charge onto the needle. The substrate 22 is electrically connected to the negative terminal 48, which imparts a negative charge onto the substrate. The solution 52 is then drawn into the spray gun 58 and sprayed onto the substrate. As the solution 52 flows through the needle 60, catalyst particles within the solution lose electrons that are magnetically attracted to the positively charged needle. As a result, the catalyst particles become positively ionized as they pass through the needle. The positively charged catalyst solution then bonds to the negatively charged substrate 22, forming a high strength and long-lasting bond. Advantageously, the magnetic attraction between the catalyst and the substrate results in a uniform coating. After the catalyst is sprayed onto the substrate, the substrate may be baked at a high temperature to prevent the catalyst from recrystallizing, as described above. The solution 32 preferably contains a mixture of microphase and nanophase anatase titanium dioxide particles blended together with an osterizer as described above. This results in a catalyst coating that is stronger and more durable than prior art filters, due to the presence of both sizes of catalyst particles, as explained above. The added strength and durability prevents catalyst particles from flaking off of the substrate 22. Further, this method provides these advantages at a relatively low cost.

Yet another method of coating the catalyst onto the substrate 22 is to simply spray the solution 52 onto the substrate without applying an electric charge onto the solution or the substrate. The catalyst coating may be less uniform than that produced via the electroplating or electrostatic spraying methods described above, due to the absence of electromagnetic attraction between the solution 52 and the substrate 22. This method is, however, simpler and less expensive.

While certain objects and advantages of the invention have been described herein above, it is to be understood that not necessarily all such objects or advantages may be achieved in accordance with any particular embodiment of the invention. Those skilled in the art will recognize that the invention may be embodied or carried out in a manner that achieves or optimizes one advantage or group of advantages as taught herein without necessarily achieving other objects or advantages as may be taught or suggested herein.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A filter for decomposing organic contaminants within a fluid, said filter comprising a substrate having a plurality of cells and an oxidation catalyst suspended on said substrate so that the catalyst coats the walls of said cells, said oxidation catalyst comprising a mixture of nanophase metal oxide and microphase metal oxide, said mixture formed by adding together a substantially nanophase component of metal oxide and a substantially microphase component of metal oxide, wherein said mixture contains at least 30% of said nanophase metal oxide, said oxidation catalyst having the property of accelerating the oxidation of said organic contaminants when said oxidation catalyst is exposed to electromagnetic radiation, said substrate configured to support the nanophase metal oxide so as to maintain a high level of contact between the contaminants and the catalyst during fluid flow without substantially impeding the flow.

2. The filter of claim 1, wherein said substrate is formed from a transition metal.

3. The filter of claim 1, wherein said substrate comprises a pleated wire mesh screen.

4. The filter of claim 1, wherein said substrate is etched prior to the application of catalyst to the substrate to enhance bonding of the catalyst with the substrate.

5. The filter of claim 1, wherein said oxidation catalyst comprises anatase titanium dioxide.

6. The filter of claim 5, wherein said oxidation catalyst comprises a mixture of nanophase anatase titanium dioxide and microphase anatase titanium dioxide.

7. The filter of claim 1, wherein said oxidation catalyst comprises a mixture of about 30% nanophase anatase titanium dioxide and about 70% microphase anatase titanium dioxide.

8. A filter for use in a purification system, said filter comprising a substrate having a plurality of cells and an oxidation catalyst suspended on said substrate so that the catalyst coats the walls of said cells, said oxidation catalyst comprising a mixture of nanophase metal oxide and microphase metal oxide, wherein said mixture contains at least 30% of said nanophase metal oxide, said oxidation catalyst electrostatically sprayed onto said substrate without the use of adhesives, said catalyst having properties so as to be able to decompose organic contaminants within a fluid by exposing said fluid to the oxidation catalyst in the presence of ultra violet light.

9. The filter of claim 8, wherein said oxidation catalyst is sprayed through a positively charged needle onto said substrate while said substrate is negatively charged.

10. The filter of claim 8, wherein said oxidation catalyst is sprayed under a pressure of 1000–1500 psi.

11. A filter for decomposing organic contaminants within a fluid, said filter comprising a substrate having a plurality of cells and an oxidation catalyst coated onto the walls of said cells, said oxidation catalyst comprising a mixture of first and second metal oxide solutions, said first metal oxide solution having substantially nanophase metal oxide particle size, said second metal oxide solution being substantially formed from a metal oxide having a particle size at least one order of magnitude larger than nanophase, wherein said mixture contains at least 30% of said nanophase metal oxide, said oxidation catalyst having the property of accelerating the oxidation of said organic contaminants when said oxidation catalyst is exposed to electromagnetic radiation, said substrate configured to support the nanophase metal oxide so as to maintain a high level of contact between the contaminants and the catalyst during fluid flow without substantially impeding the flow.

12. A filter for decomposing organic contaminants within a fluid, said filter comprising a pleated substrate having a plurality of cells and an oxidation catalyst electrostatically sprayed onto said substrate so that the catalyst coats the walls of said cells, said oxidation catalyst comprising a mixture of nanophase metal oxide and microphase metal oxide, said mixture formed by adding together a substantially nanophase component of metal oxide and a substantially microphase component of metal oxide, wherein said mixture contains at least 30% of said nanophase metal oxide, said oxidation catalyst having the property of accelerating the oxidation of said organic contaminants when said oxidation catalyst is exposed to electromagnetic radiation, said substrate configured to support the nanophase metal oxide so as to maintain a high level of contact between the contaminants and the catalyst during fluid flow without substantially impeding the flow.

13. A filter for use in a purification system, said filter comprising a pleated, wire mesh screen formed from a transition metal and an oxidation catalyst electrostatically sprayed onto said screen, said catalyst comprising a mixture of nanophase metal oxide and a metal oxide having an average particle size larger than nanophase, wherein said mixture contains at least 30% of said nanophase metal oxide, said catalyst having properties so as to decompose organic contaminants within a fluid by exposing said fluid to said catalyst in the presence of ultra violet light.

* * * * *